United States Patent
Lee et al.

(10) Patent No.: US 8,795,875 B2
(45) Date of Patent: Aug. 5, 2014

(54) BATTERY PACK OF NOVEL STRUCTURE

(71) Applicant: LG Chem, Ltd., Seoul (KR)

(72) Inventors: Jong Woo Lee, Cheongju-si (KR); Woo Yeol Kim, Cheongju-si (KR); Il Hoon Choi, Cheongwon-gun (KR); Ye Ran Kang, Gunpo-si (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/773,837

(22) Filed: Feb. 22, 2013

(65) Prior Publication Data

US 2013/0224529 A1 Aug. 29, 2013

(30) Foreign Application Priority Data

Feb. 23, 2012 (KR) .................. 10-2012-0018324

(51) Int. Cl.
*H01M 2/24* (2006.01)
*H01M 6/52* (2006.01)

(52) U.S. Cl.
USPC ............... 429/158; 429/149; 429/156

(58) Field of Classification Search
None
See application file for complete search history.

(56) References Cited

FOREIGN PATENT DOCUMENTS

| JP | 11-135093 A | 5/1999 |
|----|----|----|
| JP | 2003-323873 A | 11/2003 |
| KR | 10-2006-0060077 A | 6/2006 |
| KR | 10-1053208 B1 | 8/2011 |

OTHER PUBLICATIONS

English translation of JP 11-135093.*

* cited by examiner

*Primary Examiner* — Cynthia K. Walls
(74) *Attorney, Agent, or Firm* — Birch, Stewart, Kolasch & Birch, LLP

(57) ABSTRACT

Disclosed herein is a battery pack having a plurality of battery cells electrically connected to each other, the battery cells being chargeable and dischargeable, wherein the battery pack includes two or more kinds of battery groups having different capacities or sizes, wherein each of the battery groups includes two or more battery cells having the same capacity or size, the battery cells in each of the battery groups are connected in series to each other, and the battery cells between the battery groups are connected in parallel to each other.

15 Claims, 2 Drawing Sheets

BATTERY PACK OF NOVEL STRUCTURE

TECHNICAL FIELD

The present invention relates to a high-power, large-capacity battery pack, and, more particularly, to a battery pack having a plurality of battery cells electrically connected to each other, the battery cells being chargeable and dischargeable, wherein the battery pack includes two or more kinds of battery groups having different capacities or sizes, wherein each of the battery groups includes two or more battery cells having the same capacity or size, the battery cells in each of the battery groups are connected in series to each other, and the battery cells between the battery groups are connected in parallel to each other.

BACKGROUND ART

As mobile devices have been increasingly developed, and the demand for such mobile devices has increased, the demand for secondary batteries as an energy source has also sharply increased.

Depending upon kinds of external devices in which secondary batteries are used, the secondary batteries may be used in the form of a single battery or in the form of a battery pack having a plurality of unit cells electrically connected to each other. For example, small-sized devices, such as mobile phones, can be operated for a predetermined period of time with the power and the capacity of one battery. On the other hand, a battery pack including a plurality of batteries needs to be used in middle or large-sized devices, such as laptop computers, portable digital versatile disc (DVD) players, small-sized personal computers (PCs), electric vehicles, and hybrid electric vehicles, because high power and large capacity are necessary for the middle or large-sized devices.

Among secondary batteries, a lithium secondary battery is widely used since the lithium secondary battery has high power and large capacity.

However, various kinds of combustible materials are contained in the lithium secondary battery. As a result, the lithium secondary battery may be heated or explode due to overcharge of the lithium secondary battery, overcurrent in the lithium secondary battery, or other external physical impact applied to the lithium secondary battery. That is, the safety of the lithium secondary battery is very low. Consequently, safety elements, such as a positive temperature coefficient (PTC) element and a protection circuit module (PCM), to effectively control an abnormal state of the lithium secondary battery, such as overcharge of the lithium secondary battery or overcurrent in the lithium secondary battery, are loaded on a battery cell in a state in which the safety elements are connected to the battery cell.

As described above, one or more battery cells are used in each of the small-sized devices, whereas a middle or large-sized battery module including a plurality of battery cells electrically connected to each other is used in each of the middle or large-sized devices, such as vehicles, because high power and large capacity are necessary for the middle or large-sized devices. Size and weight of a battery module are directly related to a battery module installation space and power of a corresponding middle or large-sized device. For this reasons, manufacturers are trying to manufacture small and lightweight battery modules.

Generally, a plurality of unit cells is mounted in a cartridge in a state in which the unit cells are connected in series or parallel to each other, and a plurality of cartridges is electrically connected to each other to manufacture a battery pack.

FIG. 1 is a view typically showing series connection between unit cells of a conventional high-power, large-capacity battery pack.

Referring to FIG. 1, each unit cell is configured to have a structure in which a cathode, an anode, and a separator are provided in a case together with an electrolyte in a sealed state and a cathode tab 20 and an anode tab 30 protrude from upper and lower ends of the case. In a case in which a first unit cell 10 is disposed such that a cathode tab 20 is located at the upper end thereof, a second unit cell 11 disposed adjacent to the first unit cell 10 is disposed such that a cathode tab 21 is located at the lower end thereof. Opposite electrodes of the unit cells 10 and 11 are electrically connected to each other via an electrode lead 40 in a state in which the opposite electrodes of the unit cells 10 and 11 are adjacent to each other. A third unit cell 12 is connected in series to the second unit cell 11 in the same manner as connection between the first unit cell 10 and the second unit cell 11. Although not shown in FIG. 1, a first battery group of FIG. 1 including a plurality of unit cells connected in series to each other as described above is connected in parallel to a second battery group including a plurality of unit cells connected in the same manner as in the first battery group.

The battery groups, which are connected in parallel to each other as described above, are mounted in a housing 70 in a state in which the cathode tab 20 of the first unit cell 10 of each of the battery groups is connected to a cathode external terminal 50 and an anode tab 33 of a last unit cell 15 of each of the battery groups is connected to an anode external terminal 60. As shown in FIG. 1, the electrode tabs 20 and 30 are formed in the major axis direction of the unit cell 10. According to circumstances, the electrode tabs 20 and 30 may be formed in the minor axis direction of the unit cell 10.

In the battery pack including the unit cells 10, 11, 12, 13, 14, and 15, which are electrically connected to each other, however, the unit cells 10, 11, 12, 13, 14, and 15 have the same size or capacity. In order to reduce weight and thickness of the battery pack in consideration of design of a device to which the battery pack is applied, therefore, it is necessary to reduce the capacity of the battery pack. Alternatively, it may be necessary to change the design of the device such that the size of the device can be reduced. During a design changing process, however, electrical connection between the unit cells is complicated with the result that it may be difficult to manufacture a battery pack satisfying desired conditions.

Consequently, there is a high necessity for a high-power, large-capacity battery pack including a plurality of connected unit cells wherein the battery pack can be configured based on the form of a device to which the battery pack is applied while the capacity of the battery pack is maintained.

DISCLOSURE

Technical Problem

Therefore, the present invention has been made to solve the above problems and other technical problems that have yet to be resolved.

As a result of a variety of extensive and intensive studies and experiments to solve the problems as described above, the inventors of the present application have developed a battery pack configured by electrically connecting a plurality of battery cells having various capacities or sizes in a specific manner wherein the battery pack is variously configured based on design of a device to which the battery pack is applied.

Technical Solution

In accordance with one aspect of the present invention, the above and other objects can be accomplished by the provision of a battery pack having a plurality of battery cells electrically connected to each other, the battery cells being chargeable and dischargeable, wherein the battery pack includes two or more kinds of battery groups having different capacities or sizes, wherein each of the battery groups includes two or more battery cells having the same capacity or size, the battery cells in each of the battery groups are connected in series to each other, and the battery cells between the battery groups are connected in parallel to each other.

In the battery pack according to the present invention, therefore, the structure of the battery pack is formed by combining the battery cells such that the battery pack corresponds to design of a device to which the battery pack is applied. Consequently, the battery pack according to the present invention may flexibly correspond to various shapes of devices to which the battery pack is applied while providing high capacity. In addition, the battery cells are electrically connected to each other such that the specific conditions defined as described above are satisfied. Consequently, it is possible to fundamentally solve a voltage balancing problem caused when a battery pack is configured using various battery cells.

In a preferred example, the battery cells in each of the battery groups and the battery cells between the battery groups may have the same electrochemical properties.

In another preferred example, the battery cells between the battery groups may have the same energy density and different capacities according to sizes thereof.

In a case in which the battery cells are configured as described above, it is possible to easily manufacture the battery cells while manufacturing a battery pack using various battery cells, thereby minimizing the increase in manufacturing cost of the battery pack.

As described above, the battery pack according to the present invention includes two or more kinds of battery groups having different capacities or sizes. For example, the battery pack may include three kinds of battery groups having different capacities or sizes.

Arrangement of the battery cells constituting each of the battery groups is not particularly restricted. For example, battery cells having different capacities or sizes may be arranged adjacent to each other to form a bank. That is, battery cells belonging to different battery groups may be arranged adjacent to each other. In this arrangement structure, it is possible to easily achieve parallel connection between battery cells having different capacities or sizes and thus to simplifying electric wiring of a battery pack.

In the structure in which the battery cells between the battery groups are connected in parallel to each other as described above, it is possible to achieve voltage balancing together with the increase in capacity of the battery pack, which is apparent from experiments while will hereinafter be described.

On the other hand, in a structure in which battery cells between battery groups are connected in series to each other or a structure in which two or more battery cells in each battery group are connected in parallel to each other, it is difficult to achieve voltage balancing between battery cells having different capacities or electric wiring is very complicated when a battery pack is configured using various battery cells unlike the present invention.

As previously described, the battery pack according to the present invention is configured using battery cells having various capacities or sizes, and therefore, it is possible to easily install the battery pack in a device to which the battery pack is applied regardless of design of the device. In particular, the battery pack according to the present invention is preferably applicable when the overall thickness of the device is thin. In this case, all of the battery cells may be disposed on the same plane.

In a preferred example, the battery groups may be charged with current amounts corresponding to the capacities or sizes of the battery cells.

Preferably, the battery groups are charged using a constant current and constant voltage (CC-CV) charging method.

The structure of each of the battery cells is not particularly restricted. For example, each of the battery cells may be a plate-shaped battery cell having electrode terminals protruding from one side or opposite sides thereof.

Electric connection between the battery cells may be achieved using specific members. For example, the electrode terminals of the battery cells may be electrically connected to each other via a circuit board disposed at one side or opposite sides of each of the battery cells.

Specifically, each of the battery cells may be a plate-shaped battery cell having electrode terminals protruding from one side thereof and the electrode terminals of the battery cells may be electrically connected to each other via a circuit board disposed at the electrode terminal sides of the battery cells.

The electrical connection between the electrode terminals of the battery cells via the circuit board is achieved by a circuit of the circuit board. As a result, the battery pack has a very simplified structure. In particular, the electrical connection between the electrode terminals of the battery cells via the circuit board is preferable when it is necessary for the battery pack to have a very thin structure according to the specifications of a device to which the battery pack is applied.

Various kinds of battery cells may be used. For example, each of the battery cells may be a lithium secondary battery; however, the present invention is not limited thereto.

In accordance with another aspect of the present invention, there is provided a device including the battery pack with the above-stated construction as a power source.

A preferred example of the device, in which the battery pack according to the present invention is used, may be a mobile device, such as a laptop computer, a netbook computer, a tablet personal computer (PC), or a smart pad.

The mobile device requires a battery pack having a large capacity to size ratio and a thin thickness in consideration of consumer demand for long battery life and lightweight, thin, short, and small design. However, it is difficult for the internal space of the mobile device, in which the battery pack is installed, to have a specific size while satisfying the above requirements, e.g. a standardized rectangular parallelepiped shape. That is, a very thin mobile device has a very restricted space in which the battery pack can be installed due to installation positions of the components constituting the mobile device, and therefore, it may be difficult to standardize the battery pack installation space of the mobile device. In the battery pack according to the present invention, on the other hand, flexibility in disposition of the battery cells based on the battery groups having various sizes or capacities is very high, thereby solving the above problems once for all.

The above devices or apparatuses are well known in the art to which the present invention pertains, and therefore, a detailed description thereof will be omitted.

Effects of the Invention

As is apparent from the above description, a battery pack according to the present invention is configured by combining a plurality of battery cells such that the battery cells correspond to design of a device to which the battery pack is applied.

Consequently, it is possible to solve a voltage balancing problem and an electric wiring problem while maintaining high-capacity performance.

DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, preferred embodiments of the present invention will be described in detail with reference to the accompanying drawings. It should be noted, however, that the scope of the present invention is not limited by the illustrated embodiments.

Figure 1:
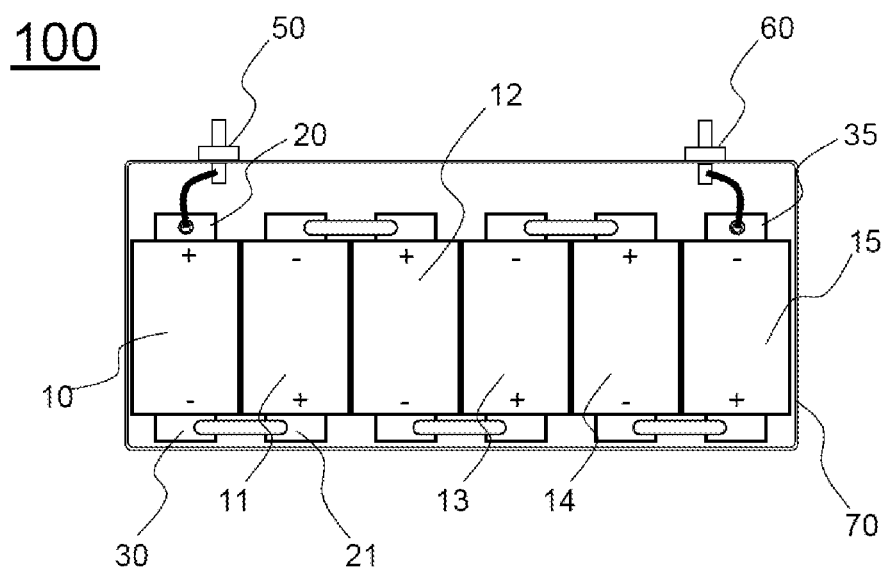
FIG. 1 is a perspective view showing a cartridge having conventional six unit cells mounted therein.
Figure 2:
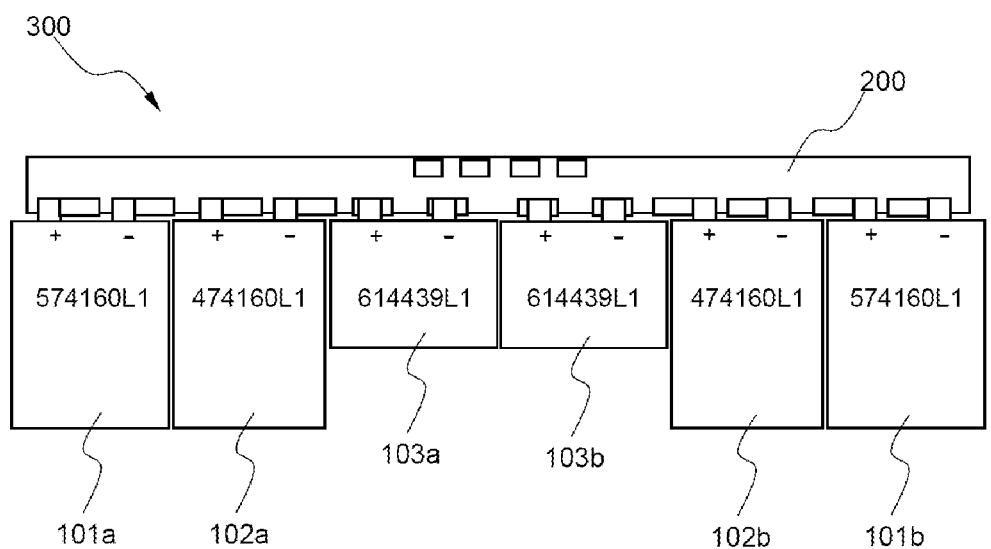
FIG. 2 is a typical view showing a state in which battery groups according to an embodiment of the present invention are arranged.

FIG. 2 is a typical view showing a state in which battery groups according to an embodiment of the present invention are arranged.

Referring to FIG. 2, a battery pack includes three kinds of battery groups 574160L1, 474160L1, and 614439L1 having different capacities. The battery group 574160L1 includes two battery cells 101a and 101b having the same size and capacity, the battery group 474160L1 includes two battery cells 102a and 102b having the same size and capacity, and the battery group 614439L1 includes two battery cells 103a and 103b having the same size and capacity.

The respective battery cells 101a, 101b, 102a, 102b, 103a, and 103b are battery cells which have the same electrochemical properties, i.e. the same electrode active materials and electrolyte, and capacities of which are decided based on sizes thereof. In addition, each of the battery cells 101a, 101b, 102a, 102b, 103a, and 103b is configured to have a plate-shaped structure in which cathode and anode terminals protrude from the upper end thereof. The battery cells 101a, 102a, and 103a, which belong to different battery groups, are disposed at the left side of the battery pack 300 in a state in which the battery cells 101a, 102a, and 103a are adjacent to each other. In the same manner, the battery cells 101b, 102b, and 103b, which also belong to different battery groups, are disposed at the right side of the battery pack 300 in a state in which the battery cells 101b, 102b, and 103b are adjacent to each other. The battery cells 101a, 102a, and 103a and the battery cells 101b, 102b, and 103b are symmetric with respect to the middle of the battery pack 200. The battery cells 101a, 101b, 102a, 102b, 103a, and 103b are generally arranged on the same plane.

As shown in FIG. 2, therefore, the lower ends of the battery cells 103a and 103b are disposed higher than those of the battery cells 101a, 101b, 102a, and 102b. In this structure, it is possible to improve flexibility in design according to the internal structure of a device to which the battery pack 300 is applied.

According to circumstances, the battery cells 102a and 102b may be disposed at opposite sides of the battery pack 300 or the battery cells 102a and 102b may be selectively disposed among the battery cells 101a, 101b, 103a, and 103b unlike the structure shown in FIG. 2.

The left-side battery cells 101a, 102a, and 103a, which are adjacent to each other and have different capacities, are connected in parallel to each other to form a bank. In the same manner, the right-side battery cells 101b, 102b, and 103b, which are adjacent to each other and have different capacities, are connected in parallel to each other to form another bank. The banks are connected in series to each other.

Such electrical connection among the battery cells 101a, 101b, 102a, 102b, 103a, and 103b is achieved through a circuit board 200 disposed at the electrode terminal sides of the battery cells 101a, 101b, 102a, 102b, 103a, and 103b.

For example, a cathode terminal (+) of the battery cell 102a of the battery group 474160L1 is connected to a cathode terminal (+) of the battery cell 101a of the battery group 574160L1 via the circuit board 200. An anode terminal (−) of the battery cell 102a of the battery group 474160L1 is connected to an anode terminal (−) of the battery cell 101a via the circuit board 200. Such connection is applied to the battery group 614439L1. As a result, the battery groups 574160L1, 474160L1, and 614439L1 are connected in parallel to each other.

Figure 3:
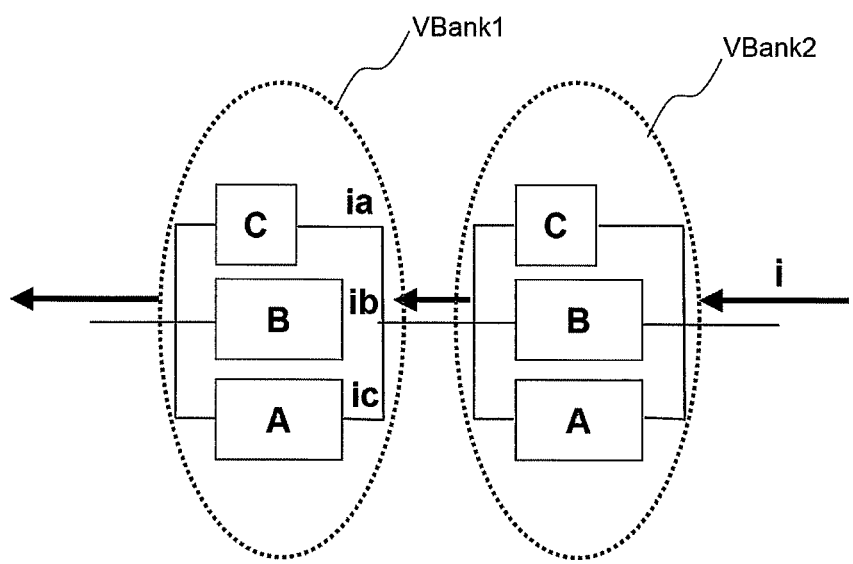
FIG. 3 is a circuit diagram showing a state in which battery groups, each of which includes two or more battery cells according to an embodiment of the present invention are connected in series to each other, are connected in parallel to each other.
Figure 4:
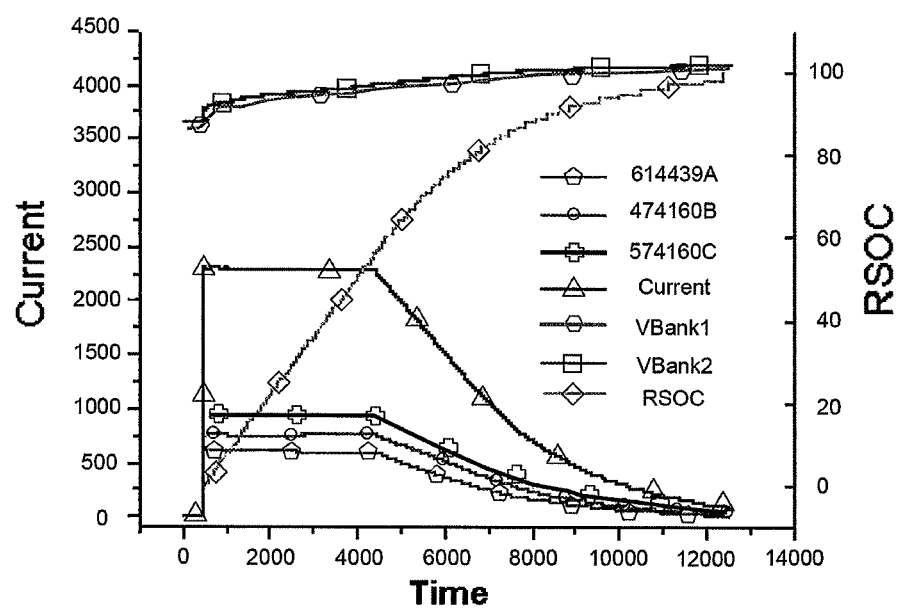
FIG. 4 is a graph showing voltage balancing according to an embodiment of the present invention.

FIG. 3 is a circuit diagram typically showing a state in which battery groups, each of which includes two or more battery cells according to an embodiment of the present invention are connected in series to each other, are connected in parallel to each other and FIG. 4 is a graph showing voltage balancing according to an embodiment of the present invention.

Referring to these drawings, a plurality of battery cells (not shown) is connected in series to each other to form at least one battery group and a plurality of battery groups A, B, and C with the above-stated construction is connected in parallel to each other to form parallel groups Vbank1 and Vbank2. The number of the battery cells (not shown) of each of the battery groups is not particularly restricted. In addition, the number of the battery groups, which are mounted in a battery pack, is not particularly restricted.

The battery cells of one battery group are connected in parallel to the battery cells of another battery group, which have different capacities or sizes than the battery cells of one battery group. When charging the battery groups with an initial current value i, therefore, the battery groups are charged using a constant current and constant voltage (CC-CV) charging method in a state in which current values ia, ib, and is corresponding to the capacities and sizes of the battery cells mounted in the respective battery groups flows to the respective battery groups. Consequently, voltage balancing among the battery groups is naturally achieved.

Experimental values of charged current amounts of the respective battery groups including battery cells having different capacities or sizes are indicated in Table 1 below.

TABLE 1

| Items | 574160(A) - ic | 474160(B) - ib | 614439(C) - ia |
|---|---|---|---|
| Capacity (Nor.) | 1930 mAh | 1540 mAh | 1206 mAh |
| Current (0.5 C) | 930 mA | 750 mA | 610 mA |

As can be seen from Table 1 above, relatively large current values are applied to the battery groups including battery cells having relatively large capacities or sizes. That is, the largest current value is applied to the battery group 574160L1, which has the largest capacity, and the smallest current value is applied to the battery group 614439L1, which has the smallest capacity, thereby achieving voltage balancing of the battery pack.

Specifically, experimental data of a graph showing automatic voltage balancing measurement results according to an embodiment of the present invention are indicated in Table 2 below.

TABLE 2

|  | 614439L1 | 474160L1 | 574160L1 | Current | Vbank1 | Vbank2 | Time | Voltage | RSOC |
|---|---|---|---|---|---|---|---|---|---|
| 1 |  |  |  |  | 3653.6 | 3655.9 | 447 | 7313 | 0 |
| 2 |  |  |  |  |  |  |  |  | 0 |
| — | — | — | — | — | — | — | — | — | — |
| 24 |  |  |  |  | 3653.2 | 3655.9 | 470 | 7502 | 0 |
| — | — | — | — | — | — | — | — | — | — |
| 59 |  |  |  |  | 3653.4 | 3656.5 | 504 | 7587 | 1 |
| — | — | — | — | — | — | — | — | — | — |
| 470 | 430 | 460 | 580 | 1470 | 3739.9 | 3743.5 | 916 | 7699 | 6 |
| 471 | 670 | 720 | 910 | 2300 | 3739.9 | 3743.5 | 917 | 7699 | 6 |
| — | — | — | — | — | — | — | — | — | — |
| 4399 | 600 | 760 | 930 | 2290 | 4000.9 | 4005.6 | 4845 | 8081 | 62 |
| — | — | — | — | — | — | — | — | — | — |
| 12005 | 20 | 40 | 60 | 120 | 4182 | 4183.8 | 12447 |  | 100 |
| — | — | — | — | — | — | — | — | — | — |
| 12238 | 20 | 40 | 50 | 110 | 4182.9 | 4184.8 | 444 |  |  |
| — | — | — | — | — | — | — | — | — | — |
| 12601 |  |  |  |  |  |  | 444 |  |  |

As can be seen from Table 2 above, the respective battery groups 574160L1, 474160L1, and 614439L1 are charged using a CC-CV charging method of initially charging the battery groups 574160L1, 474160L1, and 614439L1 with predetermined current values corresponding to the sizes of the battery groups 574160L1, 474160L1, and 614439L1 and gradually reducing the current values such that charging currents corresponding to the capacities or sizes of the battery groups 574160L1, 474160L1, and 614439L1, which are connected in parallel to each other, are applied to the battery groups 574160L1, 474160L1, and 614439L1. As a result, voltage balancing between the parallel groups Vbank1 and Vbank2 is maintained and a fully charged state of each of the battery cells is confirmed through a relative state of charge (RSOC).

The CC-CV charging method is well known in the art to which the present invention pertains, and therefore, a detailed description thereof will be omitted.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery pack having a plurality of battery cells electrically connected to each other, the battery cells being chargeable and dischargeable, wherein the battery pack comprises two or more kinds of battery groups having different capacities or sizes, wherein each of the battery groups comprises two or more battery cells having the same capacity or size, the battery cells in each of the battery groups are connected in series to each other, and the battery cells between the battery groups are connected in parallel to each other.

2. The battery pack according to claim 1, wherein the battery cells in each of the battery groups and the battery cells between the battery groups have the same electrochemical properties.

3. The battery pack according to claim 1, wherein the battery cells between the battery groups have the same energy density and different capacities according to sizes thereof.

4. The battery pack according to claim 1, wherein the battery pack comprises three kinds of battery groups having different capacities or sizes.

5. The battery pack according to claim 1, wherein battery cells having different capacities or sizes are arranged adjacent to each other to form a bank.

6. The battery pack according to claim 1, wherein all of the battery cells are disposed on the same plane.

7. The battery pack according to claim 1, wherein the battery cells between the battery groups are connected in parallel to each other, thereby achieving voltage balancing.

8. The battery pack according to claim 1, wherein the battery groups are charged with current amounts corresponding to the capacities or sizes of the battery cells.

9. The battery pack according to claim 8, wherein the battery groups are charged using a constant current and constant voltage (CC-CV) charging method.

10. The battery pack according to claim 1, wherein each of the battery cells is a plate-shaped battery cell having electrode terminals protruding from one side or opposite sides thereof.

11. The battery pack according to claim 1, wherein electrode terminals of the battery cells are electrically connected to each other via a circuit board disposed at one side or opposite sides of each of the battery cells.

12. The battery pack according to claim 1, wherein each of the battery cells is a plate-shaped battery cell having electrode terminals protruding from one side thereof, and the electrode terminals of the battery cells are electrically connected to each other via a circuit board disposed at the electrode terminal sides of the battery cells.

13. The battery pack according to claim 1, wherein each of the battery cells is a lithium secondary battery.

14. A device comprising a battery pack according to claim 1 as a power source.

15. The device according to claim 14, wherein the device is a laptop computer, a netbook computer, a tablet personal computer (PC), or a smart pad.

* * * * *